Jan. 2, 1951 A. V. BEDFORD ET AL 2,536,255

RADIO CARRIER SYNCHRONIZATION SYSTEM

Filed Jan. 29, 1949 2 Sheets-Sheet 1

Inventors
Alda V. Bedford, and
George C. Sziklai
BY Geo. J. Mitchell
ATTORNEY

Jan. 2, 1951 A. V. BEDFORD ET AL 2,536,255

RADIO CARRIER SYNCHRONIZATION SYSTEM

Filed Jan. 29, 1949 2 Sheets-Sheet 2

Inventors
Alda V. Bedford and
George C. Sziklai
BY Oliver C. Mitchell
ATTORNEY

Patented Jan. 2, 1951 2,536,255

UNITED STATES PATENT OFFICE 2,536,255

RADIO CARRIER SYNCHRONIZATION SYSTEM

Alda V. Bedford and George C. Sziklai, Princeton, N. J., assignors to Radio Corporation of America, a corporation of Delaware Application January 29, 1949, Serial No. 73,514

16 Claims. (Cl. 250—6)

This invention relates to radio transmission systems in which two or more geographically separated radio transmitters are to maintain a fixed frequency relationship between their respective carriers, and more particularly to radio transmission systems wherein two or more geographically separated radio transmitters are to transmit radio carriers having a common frequency and bearing an isochronous relationship with one another.

The present invention concerns itself more directly with a carrier synchronization system for a plurality of television transmitters operating on a common carrier frequency and located at different geographical locations but positioned sufficiently close to one another to produce reception zones in which the common frequency carrier signals from one transmitter measurably influence and interfere with the satisfactory reception of another common frequency carrier signal.

As the television art has progressed, there has arisen the desire to construct greater numbers of television transmitting stations in a given geographical area, particularly around centers of large population. Inasmuch as the frequency allocations for television service are limited in number, it has been often necessary to assign to transmitters, serving a common area, a common television channel. Although an effort has been made to carefully select the geographical locations of such co-channel stations to minimize the population included in zones likely to suffer from co-channel interference, there exists an ever increasing number of television receiver owners who suffer disturbances from such interference.

Many efforts have been made to reduce such interferencse by utilizing directive antennas at the receiving locations so as to directively discriminate against the unwanted carrier by proper orientation of the antenna. However, even with the most carefully adjusted and elaborate antenna arrays, there still remain areas in which satisfactory reception of one co-channel television station during the operation of another is impossible. In addition, directive antennas are usually objectionable because of their high cost and larger size.. The interference so produced has been found to be most objectionable when there is a substantial but small difference between carrier frequencies of the stations, this frequency difference or "beat" manifesting itself as a series of annoying horizontal bars moving in the vertical direction within the desired picture. These horizontal black bars are apparent in the picture long before the actual interfering picture information appears in the background of the desired picture.

It has been found that this black bar or "Venetian blind" interference may be eliminated by synchronizing the radio carriers of the two television stations with one another. For example, through synchronization it has been found that the visibly interfering signal may be increased in intensity by a factor between 5 and 10 times in voltage without producing serious interference in the desired image.

The present invention provides a method for achieving isochronism between two such common channel television transmitter carriers by separately monitoring the two interfering carriers at a geographical position intermediate the television transmitters. At the monitoring position, one of the received carriers (or an I. F. signal derived therefrom) is increased in frequency by a fixed amount by means of a heterodyning action. The increased carrier is then compared with the other transmitter carrier to produce a difference frequency control signal. This control signal is then transmitted by wire or other suitable means to one of the television transmitter locations along with a reference signal derived from the heterodyning oscillator employed in the increasing of the one carrier frequency. The reference signal and the difference control signal are then compared to produce a control over the associated television transmitter carrier frequency to maintain a fixed frequency relationship between the two television carriers.

It is therefore an object of the present invention to provide a new and novel method of automatically synchronizing the radio carriers of two television transmitters assigned for operation on a single television channel so as to extend the effective service areas of the stations involved.

It is another object of the present invention to provide an improved method for synchronizing the carriers of two radio transmitters assigned for operation on a common transmission frequency.

It is further an object of the present invention to provide an automatic carrier synchronization system for two television transmitters assigned for operation on a common television channel wherein the synchronizing control exercised over the transmitter system is derived from directional discriminatory reception of the two transmitter carriers at a monitoring location intermediate the involved transmitters in order to produce an automatic control information of a nature suitable for transmission over existing commercial telephone facilities.

It is still further a purpose of the present invention to provide a new and novel method for maintaining a fixed frequency relationship between two radio transmitters geographically separated from one another.

The invention possesses numerous other objects and features of advantage some of which together with the foregoing will be set forth in the following description of specific embodiments utilizing the novel method of the present invention. It is therefore to be understood that the present invention is applicable to other apparatus and systems and that its utility is in no way limited to the specific embodiments of the present application as other advantageous embodiments in accordance with the present invention as set forth in the appended claims will occur to those skilled in the art after having benefited from the teachings of the following description especially when taken in connection with the following drawings in which:

Figure 1:
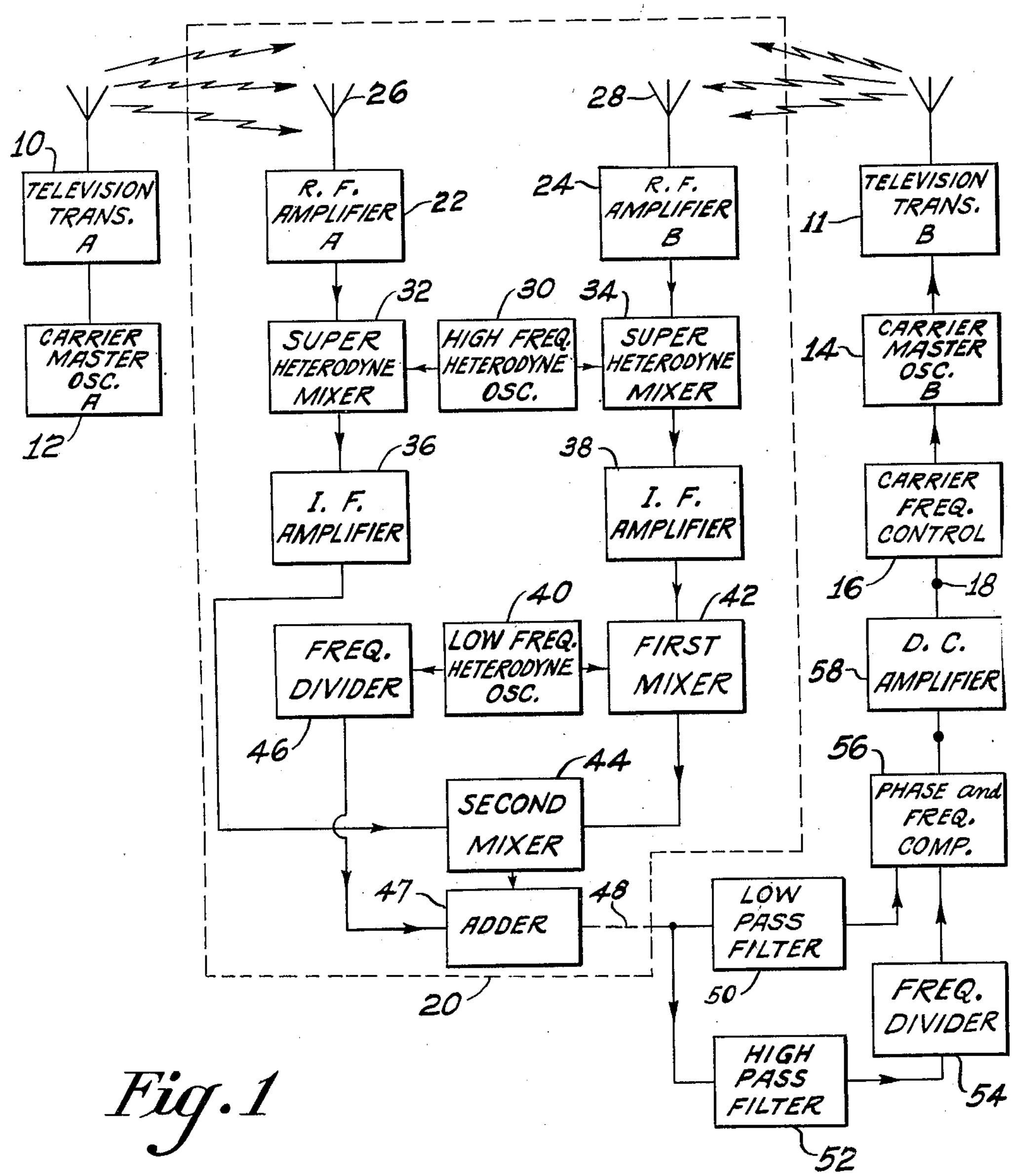
Fig. 1 is a block diagram representation of the present invention as applied to a television transmission system.

Referring now to Figure 1, there are shown at blocks 10 and 11 respectively, two geographically separated television transmitters A and B assigned for operation on a common television channel. Details of typical transmitter arrangements suitable for use in blocks 10 and 11 are described at length in an article entitled "An Experimental Television System—The Transmitter" by R. D. Kell, A. V. Bedford, and M. A. Trainer in Proceedings of I. R. E. for November 1934. It will be assumed that the carrier frequency of the television transmitter A is established by a carrier master oscillator such as 12 and with the exception of the normal drifting of such an oscillator, the carrier A is maintained at a substantially constant frequency. Television transmitter B, on the other hand, is provided with a carrier master oscillator, such as 14, which is controllable in frequency and phase by means of a carrier frequency control 16. The carrier frequency control 16 may take many forms well known in the art, such as a mechanical adjustment of a trimmer capacitor associated with the master oscillator 14, or it may take the form of the well-known reactance tube connected in shunt with a resonant circuit associated with the oscillator 14. In the present showing it will be assumed that the carrier frequency control 16 is controlled by means of a unidirectional control potential applied at the terminal 18 thereof.

In order to supply the carrier frequency control 16 with the proper control voltage at the control terminal 18 to maintain isochronism between carriers of the television transmitters A and B the present invention contemplates the use of a remote monitoring station represented by the components shown in the dotted line area 20. This monitoring station includes a first and second R. F. amplifier 22 and 24, each having a directive antenna 26 and 28 directed for pick-up of carrier energy from the respective transmitters 10 and 12. The outputs of the R. F. amplifiers 22 and 24 are mixed with a local high frequency heterodyne oscillator 30 by means of the superheterodyne mixers 32 and 34 to produce respective intermediate frequencies for amplification by the I. F. amplifiers 38 and 36. Therefore the output signal of the I. F. amplifier 36 will represent the television transmitter A carrier, while the I. F. signal appearing at the output of I. F. amplifier 38 will represent the television transmitter B carrier. It will be noted that under these conditions a one-cycle per second change in either of the carriers A or B will be manifest as a one-cycle per second change in the output signal of the corresponding I. F. amplifier.

According to the present invention, a source of low-frequency signal is provided which, at 40 in Figure 1, is represented as a low-frequency heterodyne oscillator. The output of the low-frequency heterodyne oscillator 40 is combined with the output of the I. F. amplifier 38 in the mixer circuit 42 thereby producing in the output of the mixer 42 a beat indicating signal, which may be either higher or lower than the I. F. signal delivered by the I. F. amplifier 38 by an amount equal to the operating frequency of the low frequency heterodyne oscillator 40. The carrier A intermediate frequency at the output of the I. F. amplifier 36 is mixed with the beat indicating signal developed by the first mixer 42 to develop a difference frequency control signal at the output of a second mixer 44. Since the difference between the carrier A I. F. frequency and the beat indicating signal at the output of the first mixer is substantially that of the low frequency heterodyne oscillator, the difference control signal at the output of the second mixer will be of the same order of frequency magnitude as the low-frequency heterodyne oscillator. However, the difference control signal will differ in frequency from that of the low frequency heterodyne oscillator by an amount equal to the difference between carrier A and carrier B.

The low frequency heterodyne oscillator 40 is then divided by frequency divider circuit 46 to produce a low frequency reference signal. The difference control signal developed by the second mixer and this low frequency reference signal are then added in adder circuit 47 and may then be communicated by a transmission line 48 which in some instances may be standard commercial telephone line to the location of the television transmitter B. At the transmitter B location, the incoming difference control signal and reference signal are separated by the low-pass and high-pass filters 50 and 52. The low-pass filter 50 is adapted to pass only the reference signal while the high-pass filter 52 is adapted to pass only the difference control signal. A frequency divider 54, which has substantially the same characteristics as the frequency divider 46, is applied to the output of the high-pass filter 52 to bring the difference control signal down to a range comparable in frequency to the reference signal appearing at the output of the low-pass filter. Thus, by comparing the low-pass filter output and the frequency divider output 54 by means of phase comparator 56, a D. C. output voltage may be obtained which is proportional in magnitude to the phase difference between carrier A and carrier B. This D. C. voltage may then be amplified by the D. C. amplifier 58 and applied to the control terminal 18 of the carrier frequency control 16 to maintain the carrier of transmitter B in isochronism with that of the television transmitter A. Therefore the phase comparator 56 in connection with the associated circuit may be considered a frequency comparator also.

It will be appreciated that since the phase comparator 56 is supplied with divided versions of the radio carriers A and B, the lock-in range of the system is greatly increased as compared to an arrangement incorporating no net frequency division. This, of course, assumes that the phase and frequency comparator 56 is of a conventional type which must make its complete correction in transmitter frequency within 180° of the beat or difference frequency between the two applied signals. Inasmuch as this correction must be made within the 180° it is apparent that the delay time in the frequency control loop cannot be greatly in excess of 180° of the carrier frequency difference beat, without loss of system control. Of course, once the comparator 56 begins to exercise control on the carrier B the net carrier frequency difference is less, thus increasing the half period (180°) of the beat; however, there is seen to be a definite limit in permissible loop delay time. If though, the beat frequency sensed by the comparator 56 is made lower, the half period (180°) time will be greater and correction more positive. The dividers 46 and 54 do accomplish this reduction in frequency beat and hence effectively increase the pull in range of the system. Moreover, in order for the difference control signal (corresponding to the frequency of the low frequency heterodyne oscillator) at the output of the second mixer 44 to be readily communicated over the common wire circuit such as 48 concomitantly with the reference signal, the frequency division by the divider 46 is again convenient, thus making feasible the use of the low and high-pass filters 50 and 52 to separate the difference control signal and reference signal at the transmitter location.

By way of example of change in lock-in range it can be seen that the output of the low-pass filter 50 could have been multiplied for application to the phase comparator 56 and the output of the high-pass filter 52 directly applied for comparison with the multiplied version of the low-pass filter output or multiplied reference signal. With such an arrangement, a one-cycle change in the carrier A or B would have produced a one-cycle change in the frequency difference detected by the phase comparator 56 and depending upon the characteristics of the phase comparator circuit, the lock-in range of the system may have been limited, for example, to say 50 cycles per second. If, however, in the arrangement of Figure 1, the frequency divider 46 and 54 divide by a factor, for example, of 10, the lock-in range would then be increased to 500 cycles from a carrier standpoint. With such an arrangement providing a net division in the carriers, any phase shift due to erratic behavior of the carrier propagation paths will seldom be sufficiently great to cause the control circuit to lose control over the synchronization system.

Furthermore, although not hereinbefore indicated or shown in Figure 1, for sake of illustrative simplicity, it is obvious that a certain degree of limiting action should be incorporated in the amplifiers handling the received signal so as to free the system from response due to changes in amplitude. In this respect the use of frequency dividers, which may take the form of well-known synchronization multi-vibrators, will provide an excellent limiting influence.

Figure 2:
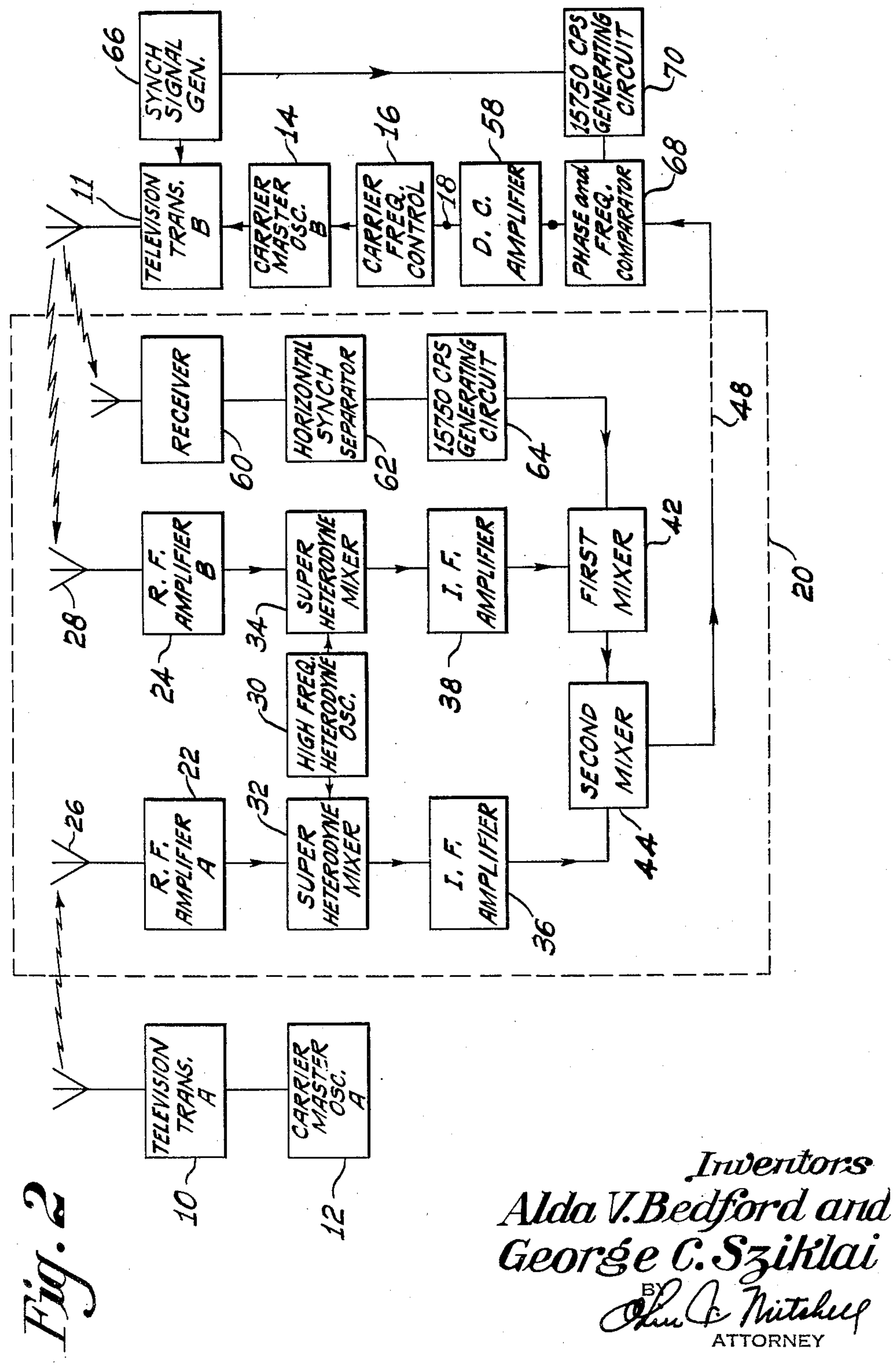
Figure 2 is a modification of the arrangement shown in Figure 1.

The arrangement in Figure 2 is substantially the same in principle as that shown in Figure 1, the only difference being that the low frequency heterodyne oscillator 40 of Figure 1 has been replaced by a source of heterodyning signals derived from the horizontal synchronizing component of the frequency controlled transmitter which, in the case of Figure 2, is transmitter B. In Figure 2, the output of the receiver 60, adapted to receive the composite television signal from transmitter B, is applied to a horizontal sync separator circuit 62, whose output in turn is applied to any well-known form of ringing circuit or synchronized oscillator represented by the generating circuit at 64. Thus, the output of the generating circuit 64 will be in synchronism with the horizontal sync pulses produced by the sync signal generator 66 modulating the television transmitter B at 11. As in Figure 1, the output of the generating circuit 64 is non-linearly mixed with the output of the I. F. amplifier 38 to produce a beat indicating signal at the output of the first mixer 42. The beat indicating signal is then mixed with the output of carrier A I. F. amplifier 36 in the second mixer 44 to produce a difference control signal which may be transmitted by the transmission line 48 to the television transmitter B location.

Upon receiving the difference control signal over the transmission line 48, the control signal is compared by means of phase and frequency comparator 68 with a 15,750 C. P. S. signal developed by the generating or ringing circuit 70. As shown, the generating circuit 70 is again of a type held in synchronism with the horizontal synchronizing pulses developed by the sync signal generator 66 and used to modulate the television transmitter 11. Thus, the unidirectional voltage output of the phase and frequency comparator 68 will be proportional to the difference in frequency between carrier A and carrier B and may be amplified by the D. C. amplifier 58 for application to the control terminal 18 of the carrier frequency control 16 as in Figure 1.

It can be appreciated that this latter method utilizing the horizontal sync pulse as a source of heterodyning energy has reduced errors, due to possible phase distortion in the system of Figure 1, which result from poor frequency characteristics of the transmission line used to concomitantly transmit the relatively high frequency output of the second mixer with the relatively low frequency reference signal obtained at the output of the frequency divider 46. Although in Figure 2 no net frequency division has been shown, in order to increase the lock-in range of the correcting action, it is clear that such a divider may be readily incorporated. For example, such a divider in Figure 2 may be interposed between the output of the second mixer 44 and the transmission line 48. This will, of course, require a corresponding divider to be interposed between the output of the 15,750 C. P. S. generating circuit 70 at the transmitter and the phase and frequency comparator 68 at the transmitter. The use of a divider at the output of the second mixer 44 in Figure 2 also is advantageous in that it reduces the frequency of the difference control signal required to be transmitted by the line 48 so that with a frequency division of say, for example, 10 to 1, the actual frequency response of the line 48 need be no higher than approximately 1575 cycles plus or minus the attendant frequency change.

With either of the above embodiments of the present system, it is apparent that there is only one conversion to a unidirectional control voltage, and thus only one "rubber link" between the means for detecting carrier frequency difference and the necessary correction of the frequency controlled transmitter to maintain isochronism. Such an arrangement is advantageous also from the standpoint of requiring a minimum of operating personnel since the operation at the monitoring location 20 may be made wholly automatic in nature.

It is clear from Figures 1 and 2 that the functions of the first and second mixers 42 and 44 may be accomplished by a single mixing circuit of suitable design and also that the separate receiver shown in Figure 2 for deriving the horizontal sync pulses may be eliminated through the use of a suitable detector supplied from the I. F. amplifier 38. With the particular arrangement of Figure 2, however, the separate receiver for deriving the horizontal sync permits the R. F. amplifier B and associated amplifier channel to have a very narrow band-pass characteristics, consequently giving an increased noise immunity to the system.

From the foregoing, it can be seen that the present invention has provided a simple, novel and effective carrier synchronization control for radio frequency transmitters which when applied to television transmission systems provides a continuous and quick-acting synchronization control thereby greatly increasing the respective service areas of adjacent co-channel television transmitters.

What is claimed is:

1. In a radio transmission system including at least a first and a second radio transmitter, a carrier synchronization control arrangement comprising in combination: means for controlling the carrier frequency of the first transmitter, said controlling means being adapted to vary the carrier frequency of the first transmitter in accordance with the characteristics of an applied unidirectional control signal, carrier receiving apparatus for receiving the carriers of said first and second radio transmitters and for heterodyning each of the received carriers with a local oscillator to produce first and second intermediate frequency signals, means for heterodyning the first intermediate frequency signal with a converter oscillator signal having a fixed frequency to produce a beat indicating signal differing in frequency from that of said first intermediate frequency signal by the frequency of said converter signal, means for heterodyning said beat indicating signal with said second intermediate frequency signal to produce a difference control signal having a frequency variation which is a function of the variation in frequency between the first and second radio transmitter carriers, and means for comparing the frequency of the so-developed difference control signal with the frequency of said converter signal to produce a unidirectional control signal for said first transmitter carrier frequency controlling means, thereby to maintain a substantially fixed frequency relationship between the first and second radio transmitter carriers.

2. In a radio transmission system including at least a first and a second radio transmitter, a carrier synchronization control arrangement comprising in combination: means for controlling the carrier frequency of one of said transmitters, said controlling means being adapted to vary the carrier frequency of the one transmitter in accordance with the characteristics of an applied unidirectional control signal, carrier receiving apparatus for receiving the carriers of said first and second radio transmitters and for heterodyning each of the received carriers with a local oscillator to produce first and second intermediate frequency signals, means for heterodyning the first intermediate frequency signal with a converter signal having a fixed frequency to produce a beat indicating signal differing in frequency from that of said first intermediate frequency signal by the frequency of said converter signal, means for heterodyning said beat indicating signal with said second intermediate frequency signal to produce a difference control signal having a frequency variation which is a function of the variation in frequency between the first and second radio transmitter carriers, and means for comparing the frequency of the so-developed difference control signal with the frequency of said converter signal to produce a unidirectional control signal for said transmitter carrier frequency controlling means, thereby to maintain a substantially fixed frequency relationship between the first and second radio transmitter carriers.

3. In a radio transmission system including at least a first and a second radio transmitter, a carrier synchronization control arrangement comprising in combination: means for controlling the carrier frequency of the first transmitter, said controlling means being adapted to vary the carrier frequency of the first transmitter in accordance with the characteristics of an applied control signal, carrier receiving apparatus for receiving the carriers of said first and second radio transmitters and for heterodyning each of the received carriers with a local oscillator to produce first and second intermediate frequency signals, means for heterodyning the first intermediate frequency signal with a converter signal having a fixed frequency to produce a beat indicating signal differing in frequency from that of said first intermediate frequency signal by the value of said converter signal frequency, means for combining the so-developed beat indicating signal with the second intermediate frequency signal to produce a difference control signal having a frequency variation which is a function of the carrier frequency variation between said first and second radio transmitters, frequency dividing means adapted to divide the converter signal by a predetermined factor to produce a reference signal, and means for combining said difference control signal with said reference signal for concomitant transmission over a communicating means directed to said first radio transmitter whereby the frequency variation of said difference control signal with respect to said reference signal may be translated into a control signal for said first transmitter frequency controlling means such as to maintain a substantially fixed frequency relationship between the first and second carriers.

4. In a radio transmission system including at least a first and a second radio transmitter, a carrier synchronization control arrangement cmoprising in combination; means for controlling the carrier frequency of the first transmitter, said controlling means being adapted to vary the carrier frequency of the first transmitter in accordance with the characteristics of an applied unidirectional control signal, carrier receiving apparatus for receiving the carriers of said first and second radio transmitters and for heterodyning each of the received carriers with a local oscillator to produce first and second intermediate frequency signals, means for heterodyning the first intermediate frequency signal with a converter signal having a fixed frequency to produce a beat indicating signal differing in frequency from that of said first intermediate frequency signal by the value of said converter signal frequency, means for combining the so-developed beat indicating signal with the second intermediate frequency signal to produce a difference control signal having a frequency variation which is a function of the carrier frequency variation between said first and second radio transmitters, frequency dividing means adapted to divide the converter signal by a predetermined factor to produce a reference signal, means for combining said difference control signal with said reference signal for concomitant transmission over a communicating means directed to said first radio transmitter, and means adjacent said first transmitter for comparing the frequency of the communicated difference control signal of the communicated reference signal to produce a unidirectional control signal for application to said first transmitter frequency controlling means such as to maintain a substantially fixed frequency relationship between the first and second carriers.

5. In a radio transmission system including at least a first and a second radio transmitter, a carrier synchronization control arrangement comprising in combination: means for controlling the carrier frequency of the first transmitter, said controlling means being adapted to vary the carrier frequency of the first transmitter in accordance with the characteristics of an applied control signal, carrier receiving apparatus for receiving the carriers of said first and second radio transmitters and for heterodyning each of the received carriers with a local oscillator to produce first and second intermediate frequency signals, means for heterodyning the first intermediate frequency signal with a converter signal having a fixed frequency to produce a beat indicating signal differing in frequency from that of said first intermediate frequency signal by the value of said converter signal frequency, means for combining the so-developed beat indicating signal with the second intermediate frequency signal to produce a difference control signal having a frequency variation which is a function of the carrier frequency variation between said first and second radio transmitters, frequency dividing means adapted to divide the converter signal by a predetermined factor to produce a reference signal, means for combining said difference control signal with said reference signal for concomitant transmission over a single communicating means directed to said first radio transmitter, filter means adjacent the first transmitter for separating said difference control signal from said reference signal, frequency dividing means adapted to divide the separated difference control signal by the same predetermined division factor applied to said converter signal, and means for comparing the phase and frequency of the so-divided difference control signal with the separated reference signal to produce a control signal for said first transmitter frequency controlling means, thereby to maintain a substantially fixed frequency relationship between the first and second radio transmitter carriers.

6. In a radio transmission system including at least a first and a second radio transmitter, a carrier synchronization control arrangement comprising in combination: means for controlling the carrier frequency of the first transmitter in accordance with the characteristics of an applied control signal, carrier receiving apparatus for receiving the carriers of said first and second radio transmitters, means for producing first and second intermediate frequency signals from the first and second received radio carriers, means for heterodyning the first intermediate frequency signal with a converter signal having a substantially fixed frequency to produce a beat indicating signal differing in frequency from that of said first intermediate frequency signal by the value of said converter signal frequency, means for combining the so-developed beat indicating signal with the second intermediate frequency signal to produce a difference control signal having a frequency variation which is a function of the carrier frequency variation between said first and second radio transmitters, frequency dividing means adapted to divide the converter signal by a predetermined factor to produce a reference signal, and means for combining said difference control signal with said reference signal for concomitant transmission over a communicating means directed to said first radio transmitter whereby the frequency variation of said difference control signal with respect to said reference signal may be translated into a control signal for said first transmitter frequency controlling means such as to maintain a substantially fixed frequency relationship between the first and second carriers.

7. In a television transmission system including at least a first and a second radio transmitter each adapted for carrier modulation by composite television signals, a system for reducing the deleterious influence of one transmitted signal upon the other at a receiving location remote from both transmitters, said system comprising in combination, means for controlling the carrier frequency of the first transmitter, said controlling means being adapted to vary the first transmitter carrier frequency in accordance with the characteristics of an applied unidirectional control signal, carrier receiving apparatus located at a monitoring position geographically situated to permit concomitant reception of the radio carriers of both the first and second transmitters, means for producing first and second intermediate frequency signals from the received carriers of said first and second transmitters, a converter oscillator having a fixed operating frequency of a predetermined value, means for mixing the output signal of said converter oscillator with the first intermediate frequency signal to produce a beat indicating signal differing in frequency from that of said first intermediate frequency signal by an amount equal to the operating frequency of said converter oscillator, means for non-linearly combining said beat indicating signal with said second intermediate frequency signal to produce a difference control signal having frequency variations corresponding to the frequency variations between said first and second radio transmitter carriers, the frequency value of said difference control signal being substantially in the vicinity of the frequency of said converter oscillator, a frequency dividing arrangement adapted to divide the output of said converter oscillator by a predetermined factor to produce a reference signal, means for combining said difference control signal with said reference signal for concomitant transmission to said first transmitter, a frequency discriminatory means adjacent said first transmitter for separating said difference control signal from said reference signal, means for dividing the separated difference control signal by the same predetermined division factor applied to said converter oscillator, a phase and frequency discriminatory circuit adapted to receive and compare the so-divided difference control signal with said reference signal to produce a unidirectional control signal for application to the first transmitter carrier frequency controlling means, whereby substantially fixed frequency relationship between the first television carrier and the second television carrier may be maintained.

8. In a television transmission system including at least a first and a second radio transmitter each adapted for carrier modulation by composite television signals, a system for reducing the deleterious influence of one transmitted signal upon the other at a receiving location remote from both transmitters, said system comprising in combination: means associated with one of said transmitters for controlling the carrier frequency thereof in accordance with an applied unidirectional control signal, carrier receiving apparatus located at a monitoring position geographically situated to permit concomitant reception of the radio carriers of both the first and second transmitters, means for producing first and second intermediate frequency signals from the received carriers of said first and second transmitters, a converter oscillator having a substantially fixed operating frequency of a predetermined value, means for mixing the output signal of said converter oscillator with the first intermediate frequency signal to produce a beat indicating signal differing in frequency from that of said first intermediate frequency signal by an amount equal to the operating frequency of said converter oscillator, means for non-linearly combining said beat indicating signal with said second intermediate frequency signal to produce a difference control signal having frequency variations corresponding to the frequency variations between said first and second radio transmitter carriers, the frequency value of said difference control signal being substantially in the vicinity of the frequency of said converter oscillator, a frequency dividing arrangement adapted to divide the output of said converter oscillator by a predetermined factor to produce a reference signal, means for combining said difference control signal with said reference signal for concomitant transmission to that radio transmitter having the associated frequency controlling means, a frequency discriminatory means adjacent said frequency controlled transmitter for separating said difference control signal from said reference signal, means for dividing the separated difference control signal by the same predetermined division factor applied to said converter oscillator, a phase and frequency comparator circuit adapted to receive and compare the so-divided difference control signal with said reference signal to produce a unidirectional control signal for application to the first transmitter carrier frequency controlling means, whereby substantially fixed frequency relationship between the first television carrier and the second television carrier may be maintained.

9. In a television transmission system including at least a first and a second radio transmitter each adapted for carrier modulation by composite television signals, a system for reducing the deleterious influence of one transmitted signal upon the other at receiving locations remote from both transmitters, said system comprising in combination: means associated with one of said transmitters for controlling the carrier frequency thereof in accordance with an applied unidirectional control signal, carrier receiving apparatus located at a monitoring position permitting concomitant reception of both said first and second transmitter radio carriers, means for deriving first and second intermediate frequency signals from the received first and second radio transmitter carriers, a source of low frequency signal, means for non-linearly mixing said low frequency signal with the first intermediate frequency signal to produce a beat indicating signal differing in frequency from that of said first intermediate frequency signal by the frequency value of the low frequency signal, means for combining the beat indicating signal with the second intermediate frequency signal to produce a difference control signal having a frequency value in the range of said low frequency signal but varying in frequency in accordance with variations in frequency between said first and second radio transmitter carriers, means for deriving a reference signal from said low frequency signal source, said reference signal being in synchronism with the signal from said low frequency source, means for comparing the difference control signal with said reference signal to produce a unidirectional control signal in accordance with variations in frequency between said difference control signal and said reference signal, and means for applying the unidirectional control signal so produced to the frequency controlling means associated with said one of said transmitters, thereby to maintain a substantially fixed frequency relationship between the first transmitter television carrier and the second transmitter television carrier.

10. Apparatus according to claim 9 wherein said low frequency signal source is controlled by the television synchronizing pulses transmitted by that television transmitter having associated therewith said frequency controlling means.

11. In a television transmission system including at least a first and a second radio transmitter each adapted for carrier modulation by composite television signals, a system for reducing the deleterious influence of one transmitted signal upon the other at receiving locations remote from both transmitters, said system comprising in combination: means for controlling the carrier frequency of the first transmitter, said controlling means being adapted to vary the carrier frequency of the first transmitter in accordance with characteristics of an applied control signal, carrier receiving apparatus located at a monitoring position permitting concomitant reception of the radio carriers of both the first and second transmitters, means for deriving first and second intermediate frequency signals from the received carriers of said first and second transmitters, means for deriving a converting signal from the synchronizing component of the received carrier from said first transmitter, means for non-linearly mixing the converting signal with the first intermediate frequency signal to produce a beat indicating signal, means for heterodyning the beat indicating signal with the second intermediate frequency signal to produce a difference control signal, and means adapting said difference control signal for communication to said first television transmitter for frequency and phase comparison with a signal derived from the transmitted television synchronizing component such as to develop a control signal for application to said first television transmitter frequency controlling means.

12. In a radio transmission system including at least a first and a second radio transmitter each adapted for modulation by a respective modulating signal, a carrier synchronization control arrangement comprising in combination: means for controlling the carrier frequency of the first transmitter in accordance with the characteristics of an applied control signal, carrier receiving apparatus for receiving the first and second radio carriers to produce first and second intermediate frequency signals, means for deriving from the modulation of said first transmitter carrier a converting signal, means for non-linearly mixing said converting signal with said first intermediate frequency signal to produce a beat indicating signal, means for non-linearly combining said beat indicating signal with said second intermediate frequency signal to produce a difference control signal, means adapting said difference control signal for communication to said first radio transmitter, means associated with said first radio transmitter for developing a comparator signal from the modulating signal of said first transmitter, and means for comparing the phase and frequency of said difference control signal with said comparator signal to develop a control signal for said first transmitter carrier frequency controlling means, thereby to maintain a predetermined frequency relationship between the first and second carriers.

13. In a television transmission system employing at least a first and a second geographically separated radio transmitter each adapted for carrier modulation by composite television signals and wherein there is included means for controlling the carrier frequency of the first transmitter in accordance with the characteristics of a unidirectional control signal applied to said controlling means, and wherein there is provided a geographical monitoring location permitting concomitant reception of the radio carriers from both the first and second transmitters, a system for reducing the deleterious influence of one transmitted signal upon the other at any receiving location remote from both transmitters comprising in combination: carrier receiving apparatus located at the monitoring location for directional concomitant and discriminatory reception of both said first and second carriers, means for heterodyning the received first and second radio transmitter carriers with a local heterodyning oscillator to produce first and second intermediate frequency signals, a source of low frequency converting signal, means for non-linearly combining said converting signal with the first intermediate frequency signal to produce a beat indicating signal, means for non-linearly combining the beat indicating signal with the second intermediate frequency signal to produce a difference control signal, a frequency divider circuit adapted to divide the frequency of said low-frequency converting signal by a predetermined factor to produce a reference signal, and means for combining the difference control signal and the reference signal and adapting the combination for transmission over wire communication circuits between said monitoring location and the location of the first transmitter so that the communicated difference control signal and reference signal may be compared at the first television transmitter location to derive a control signal for application to the first television transmitter carrier frequency controlling means.

14. Apparatus according to claim 13 wherein said low frequency converting signal has a frequency value falling within the audio frequency range.

15. Apparatus according to claim 13 wherein there is additionally provided at the location of the first transmitter low and high pass filter means for separating the difference control signal and the reference signal as communicated thereto such that the difference control signal is translated only by said high-pass filter while the reference signal is translated only by said low-pass filter, frequency dividing means connected to the output of said high-pass filter for dividing the difference control signal by a factor equal to the frequency ratio of said low-frequency converter signal to said reference signal, a phase and frequency comparator circuit for comparing the frequency and phase of said reference signal and the divided difference control signal to develop a unidirectional control signal for application to the first radio transmitter frequency controlling means, such that a predetermined frequency relationship may be maintained between said first and second radio transmitters.

16. Apparatus according to claim 13 wherein said frequency divider circuit for producing the reference signal from said low frequency converting signal has a division factor sufficient to produce a reference signal falling within the audio frequency range.

ALDA V. BEDFORD.
GEORGE C. SZIKLAI.

REFERENCES CITED

The following references are of record in the file of this patent:

UNITED STATES PATENTS

| Number | Name | Date |
|---|---|---|
| 1,926,169 | Nyquist | Sept. 12, 1933 |
| 2,085,424 | Goddard | June 29, 1937 |
| 2,190,037 | Neufeld | Feb. 13, 1940 |
| 2,218,636 | Bruckner | Oct. 22, 1940 |
| 2,404,568 | Dow | July 23, 1946 |

FOREIGN PATENTS

| Number | Country | Date |
|---|---|---|
| 735,055 | France | Aug. 13, 1932 |

OTHER REFERENCES

Radio News for February 1928, pp. 885 and 936. "Keeping Broadcasts in Step on the Waveband Stops all Squealing," by John H. Meredith.

Radio Engineering, vol. II, December 1931, pp. 26–29, "Wireless Synchronization," by Verne V. Gunsolley.

Institute of Radio Engineers, vol. 35, 1935, Proceedings, pp. 244–248, "Automatic Syntraction of Two Broadcast Carriers," by Verne V. Gunsolley.